US012193984B2

(12) United States Patent
Tsai

(10) Patent No.: US 12,193,984 B2
(45) Date of Patent: Jan. 14, 2025

(54) DEVICE WITH ANTIGRAVITY AND SUSPENSION

(71) Applicant: Fu An Wellness Technology, Inc., Taipei (TW)

(72) Inventor: Shih-Ying Tsai, Taipei (TW)

(73) Assignee: Fu An Wellness Technology, Inc., Taipei (TW)

(*) Notice: Subject to any disclaimer, the term of this patent is extended or adjusted under 35 U.S.C. 154(b) by 463 days.

(21) Appl. No.: 17/654,313

(22) Filed: Mar. 10, 2022

(65) Prior Publication Data

US 2022/0287903 A1 Sep. 15, 2022

(30) Foreign Application Priority Data

Mar. 11, 2021 (TW) ................................ 110108782

(51) Int. Cl.
*A61H 1/02* (2006.01)

(52) U.S. Cl.
CPC ..... *A61H 1/0229* (2013.01); *A61H 2201/123* (2013.01); *A61H 2201/1652* (2013.01)

(58) Field of Classification Search
CPC .................. A61H 1/0229; A61H 3/008; A61H 2203/0481; A61H 2201/123; A61H 2201/1664; A61H 2201/16; A63B 69/0064; A63B 21/0058; A63B 21/00181; A63B 21/4009; A63B 21/0085; A63B 21/0428; A63B 71/0619; A63B 2071/0658
See application file for complete search history.

(56) References Cited

U.S. PATENT DOCUMENTS

| | | | | |
|---|---|---|---|---|
| 5,174,590 | A * | 12/1992 | Kerley | A61H 3/04 280/87.051 |
| 5,192,305 | A * | 3/1993 | Sastre | A61H 1/0229 606/241 |
| 8,020,829 | B1 * | 9/2011 | Tamayori | F16M 13/00 108/144.11 |
| 8,464,716 | B2 * | 6/2013 | Kuehne | A63B 21/068 601/19 |
| 10,493,309 | B2 * | 12/2019 | Jue | A63B 21/00069 |
| 2007/0016116 | A1 * | 1/2007 | Reinkensmeyer | A63B 21/00181 601/5 |

(Continued)

FOREIGN PATENT DOCUMENTS

WO WO-2019038653 A1 * 2/2019

*Primary Examiner* — Samchuan C Yao
*Assistant Examiner* — Mishal Zahra Hussain
(74) *Attorney, Agent, or Firm* — Wang Law Firm, Inc.

(57) ABSTRACT

A device with anti-gravity suspension is provided, comprising: a base, a torso support unit and a torso-wearing unit; wherein, the base is provided with two rails erected on two opposite sides; the torso support unit is connected to and movable up and down along the two rails, the torso support unit has a torso-holding portion for accommodating a torso, and the torso-holding portion is acted on by at least one actuating element disposed on the torso support unit to move up and down vertically; the torso-wearing unit is worn on the torso of a user, and a second coupling element disposed on the torso-wearing unit is connected to a first coupling element disposed on the torso-holding portion. When the user is held by the torso-holding portion, the torso weight load on the lower limbs can be reduced.

7 Claims, 8 Drawing Sheets

(56) References Cited

U.S. PATENT DOCUMENTS

2016/0000155 A1* 1/2016 Marecek .............. A63B 21/065 2/227
2020/0221975 A1 7/2020 Basta et al.

* cited by examiner

DEVICE WITH ANTIGRAVITY AND SUSPENSION

BACKGROUND OF THE INVENTION

1. Field of the Invention

The present invention relates generally to the field of sports fitness equipment, more particularly, to a device to be used with other fitness equipment as a device with anti-gravity and suspension for rehabilitation correction and sports fitness.

2. The Prior Arts

The posture of the human torso, like the torso itself, is coupling elemently controlled by different systems, each system corresponds to several different coupling elements, and the coupling elements indirectly affect different muscles. Therefore, directly regulating the system can be more efficient in changing the activity of multiple coupling elements and the retraction and release of multiple muscles. However, how to regulate and where to start, it should be first understood that each coupling element is a combination of nerves (including skin sensory receptors), muscles (including proprioceptive receptors), and bones. According to the Hilton's Law proposed by John Hilton in 1880-1862, the nerves branched from the same nerve trunk not only innervate the muscles of the coupling element, but also control the skin covering the muscle group and the inside of the coupling element itself. It can be seen that the brain's output control of coupling element activity is highly correlated with the input of sensory information. Therefore, the rhythm of the torso can be smoothed through continuous feedback and adjustment. Therefore, it is absolutely critical that the adjustment and treatment of posture must take into account how to change the output of action information by controlling or changing the input of sensory information.

Torso movement is a combination of a series of movements of different coupling elements. Therefore, when we treat a single coupling element, it will affect other coupling elements. The connection between different coupling elements is called coupling element puzzle or coupling element chain. The movement of coupling elements is controlled by the brain through nerves. Therefore, if the treatment cannot change the original setting of the brain through new sensory stimuli so that the movement output sent by the brain becomes different, the torso will still stay the same as before because of habit. Therefore, an effective treatment must take into account the connection between the various coupling elements and the new stimulation of the central nervous system.

The concept of therapy is to decompress and pressurize the system or coupling elements (i.e., unload & load). Due to aging and various long-term pressures in daily life, the torso's sensitivity to receive external information is reduced or the receptors becoming rigid, which makes the torso unable to adjust properly. For example, after looking at the computer for a long time at work, the eyes gradually get closer to the screen, causing the turtle's neck and hunchback "unconsciously". Therefore, when we decompress the torso, let the torso first set into a stress-free state, that is, to relax the torso's sensory receptors and associated coupling elements, and then pressurize to give the brain correct posture information and the ability to the torso to withstand stress, so as to improve the low torso self-awareness, which can make the torso posture in a more elastic state, able to adapt to different environmental pressures, just like the tumbler able to stand back upright after push. As such, the brain that did not think the torso is tilted becomes aware of its own tilt and automatically adjust.

In addition, the human torso is always under the influence of gravity when moving. The torso is pulled to the ground, and the coupling elements are gradually worn away. Therefore, training and treatment to counteract the gravity is very important. In addition, according to the theory of Newton's third law of motion "action and reaction", when the foot is pulled towards the ground by gravity, the ground will have a reaction force on the foot, and then pass through the legs, pelvis, spine, and finally upload to the head. When writing or using a computer, the desk will give the supporting arm a reaction force upwards. This reaction force will not only give the torso a sensory signal from the outside, but also put a pressure on the coupling elements. If this pressure cannot be absorbed or dissipated by the torso, it may cause damage to the place that is under too much pressure. Therefore, how to train the torso to absorb and disperse the pressure efficiently is a very important issue.

Conventional fitness equipment such as treadmills or corrective rehabilitation equipment will be affected by gravity when in use, so that while during exercising or correcting rehabilitation, the torso is also pulled to the ground, causing coupling elements and other portions to gradually wear away.

In order to overcome the problem of gravity, U.S. Pat. No. 8,464,716 provides a differential air pressure system, the air pressure differential system includes a chamber for accommodating a portion of the lower torso of the user's torso, and air is injected into the chamber, the user's torso accommodated in the chamber is subjected to the buoyancy force generated by the air pressure difference, thereby resisting the effect of the gravitational force on the human torso. However, U.S. Pat. No. 8,464,716 providing a differential air pressure system must include elements such as an air compressor, a pressure sensor, a regulating valve, an airbag chamber, a seal for sealing the chamber to the user's torso, and so on. The structure is complex and the manufacturing cost is high.

US Publication No. US 2020/0221975 provides an unweighted gait training system, and the unweighted system can be a barometric differential unweighted system or a non-barometric differential unweighted system. Wherein, the differential air pressure unweighted system has the same problem as U.S. Pat. No. 8,464,716. The non-air pressure difference unweighted system can use the frame to support the user's torso, but its detailed mechanism is not clearly disclosed, and the user is easily interfered by the frame when moving in the buoyancy state, which affects the flexibility of the movement. Moreover, because there is no sufficient connection means between the user's torso and the frame, the user cannot guarantee sufficient safety when using other equipment.

SUMMARY OF THE INVENTION

A primary objective of the present invention is to provide a device with device with anti-gravity and suspension, which can be used in conjunction with other fitness equipment or correction and rehabilitation equipment to reduce the torso weight load on the user's lower limbs, so that the lower limbs and coupling elements are in a state of less stress and more relaxation, while being able to provide the user with sufficient safety when using other equipment.

The device with anti-gravity and suspension provided by the present invention includes: a base disposed with two rails erected symmetrically on two opposite sides; a torso support unit, connected to the two rails, and movable up or down along the rails, and the torso support unit having a torso-holding portion for accommodating a torso of a user and at least one actuating element, the at least one actuating element exerts a force on the torso-holding portion to make the torso-holding portion vertically ascending or descending along the rails, the torso-holding portion having a first coupling element; and a torso-wearing unit for being worn on the torso of the user, the torso-wearing unit having a second coupling element, the second coupling element being for interconnection with the first coupling element; wherein, when the actuating elements are operated, the torso-holding portion is lifted up to an appropriate height, so that the human torso is in a suspended state and resists gravity, thereby reducing the load on the user's lower limbs. Also, by combining the torso-wearing unit with the torso-holding portion, the user is protected to have sufficient safety when using other equipment.

Preferably, the torso support unit in the present invention includes a beam, the torso-holding portion is fixedly connected to the beam, both two ends of the beam extend into the two rails respectively, and the end extending into the rails is provided with at least one roller, and the roller is in rolling contact with the inner wall of the rail. The height of the beam can be moved up or down by the rolling contact between the rollers disposed at both ends of the beam and the inner wall of the rails, so as to adjust the height of the torso support unit.

Preferably, a counterweight unit connected to the beam is disposed in the rail to assist a force to move the torso support unit up or down. Thereby, the user can move the beam up or down with less effort, thereby adjusting the height of the torso support unit.

Preferably, the counterweight unit comprises: a pulley, rotatably arranged in the rail; at least one cable, around the pulley, one end of the cable connected to the beam; and a counterweight, connected to the other end of the cable. As such, when the beam moves up, the counterweight moves down through the linkage of the cables to offset the weight of the beam, so that the user can lift the beam with less effort; when the beam moves down, the counterweight moves upward through the linkage of the cables to offset the weight of the beam, so as to prevent the beam from falling quickly and hurting people.

Preferably, the torso support unit has a fixing frame on which a plurality of the actuating elements is arranged, and the torso-holding portion is connected to the actuating elements. Thereby, the height of the torso-holding portion can be finely adjusted by the actuating element, so that the torso-holding portion accommodating the human torso can be appropriately lifted upward to an appropriate height.

Preferably, the actuating element is a linear actuator, such as an electric cylinder, a pneumatic cylinder, and so on.

Preferably, the torso-holding portion has an annular frame, and a holding element is disposed in the annular frame, the holding element has a through hole for accommodating the torso, and the circumference of the through hole is provided with the first coupling element, the torso of the user is held in the torso-holding portion by the first coupling portion and the second coupling portion of the torso-wearing unit being connected to each other.

Preferably, corresponding positions of the fixing frame and the annular frame are respectively provided with a gap. Thereby, the user can easily get in and out of the torso-holding portion. In addition, the annular frame is divided by four gaps into four independent arc-shaped portions, and each of the arc-shaped portions is driven by a plurality of actuating elements, so as to adapt to the torso shape of different users and/or matching the form of sports equipment or rehabilitation equipment, and through fine-tuning of actuating element to adjust the most suitable height of a specific portion of the annular frame.

Preferably, the torso support unit is connected to an extension rod, the extension rod is provided with a pivot element, the pivot element is provided with a display, and the display is rotatable relative to the extension rod through the pivot element. When the device with anti-gravity and suspension of the present invention is used with fitness equipment or rehabilitation equipment, the angle of the display connected to the fitness equipment or rehabilitation and correction equipment can be adjusted so that the user can easily obtain the displayed information.

Preferably, the first coupling element and the second coupling element are respectively a first zipper and a second zipper that can be coupled to each other for easy connection operation of the torso-wearing unit and the torso-holding portion.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a portion of this specification. The drawings illustrate embodiments of the invention and, together with the description, serve to explain the principles of the invention.

The terms "first" and "second" described below are for the purpose of distinguishing components, and are not used to limit the order of arrangement or installation of components.

Figure 1:
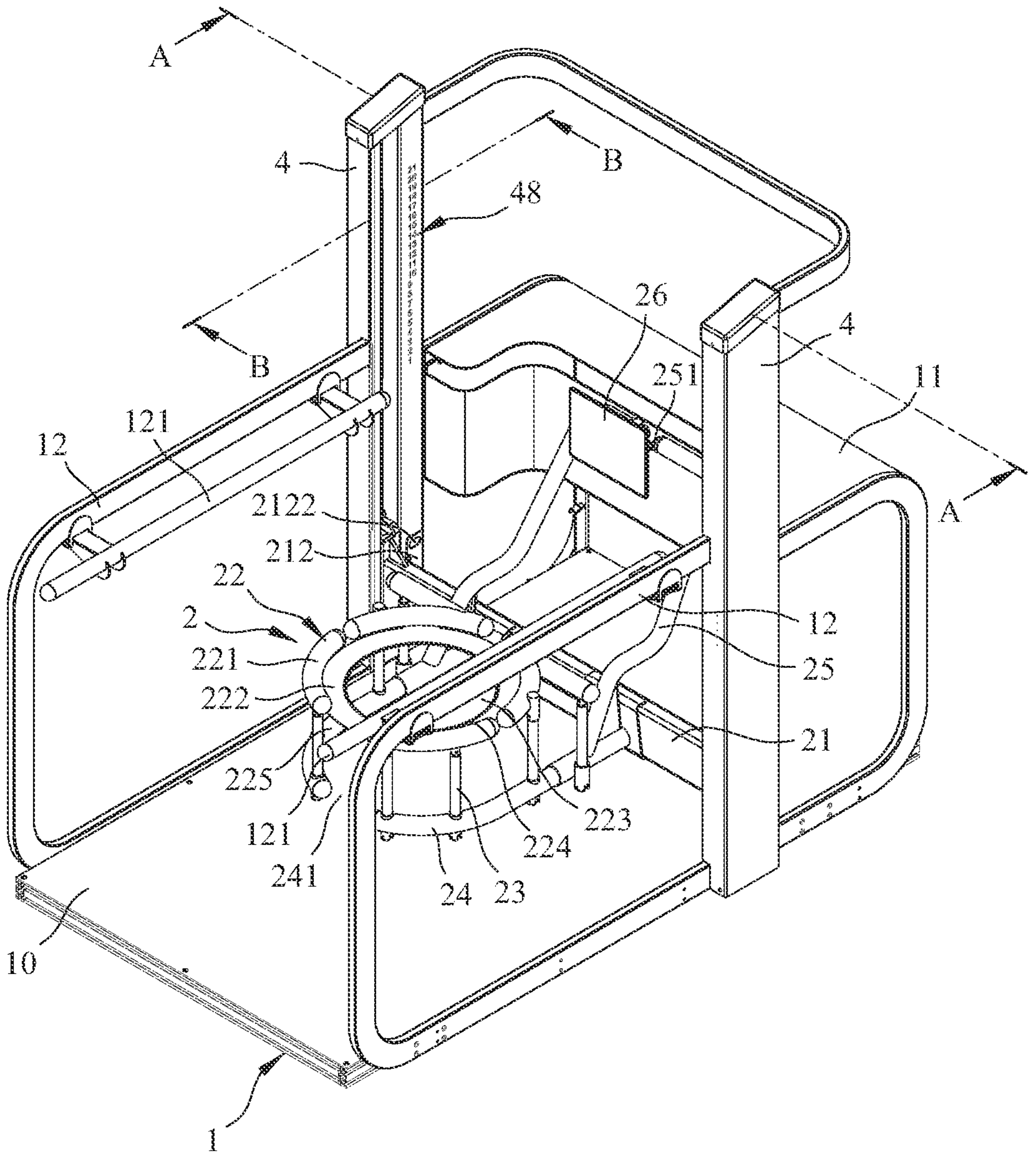
FIG. 1 is a three-dimensional schematic view showing the appearance of the present invention.
Figure 2:
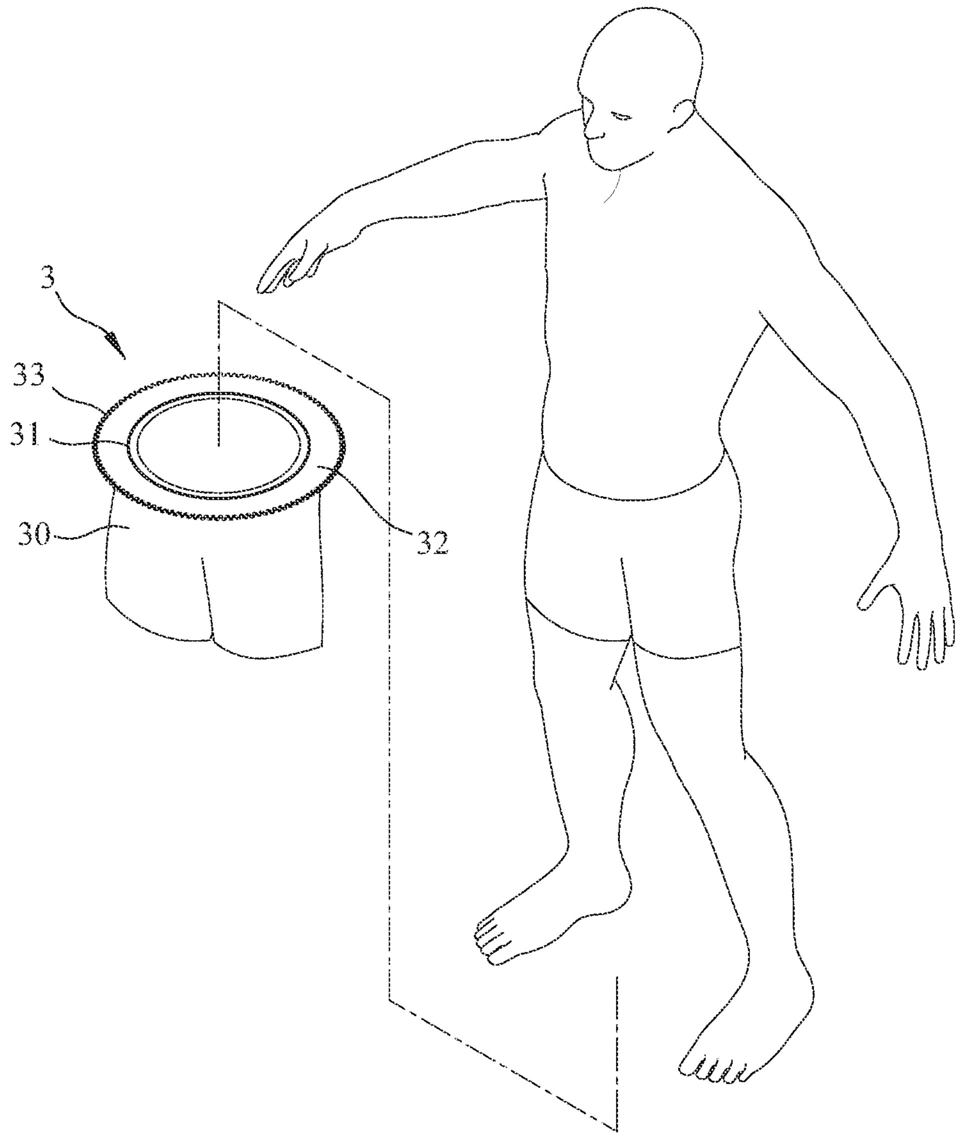
FIG. 2 is a schematic view showing the relationship between the user and the torso-wearing unit.

As shown in FIG. 1 and FIG. 2, a preferred embodiment of the device with anti-gravity and suspension of the present invention includes: a base 1, a torso support unit 2 and a torso-wearing unit 3; wherein, the base 1 includes a platform 10 on which equipment such as treadmills, rehabilitators, etc. can be set up; the front end of the base 1 is used as an entrance for users to enter and exit, and the rear end is equipped with an electromechanical box 11, the inside of the electromechanical box 11 is provided an electromechanical device configured to control the movement of the torso support unit 2. Two rails 4 are erected symmetrically on two opposite sides of the base 1, a U-shaped side bar 12 is respectively connected between the two rails 4 and the base 1, and a handrail 121 is respectively disposed on the opposite surfaces of the two side bars 12 to assist the user to enter and exit the base 1 safely; the lower side of the U-shaped side bar 12 is locked on the side of the platform 10, and the upper end of the U-shaped side bar 12 is fixed on the rail 4; therefore, after the side bar 12 is installed, an L shape is shown above the horizontal plane of the platform 10, so that the handrail 121 is installed on the upper side of the U-shaped side bar 12. The side bar 12 is not limited to the shape of U, and any other suitable shape can also be adopted according to the actual situation.

Figure 3:
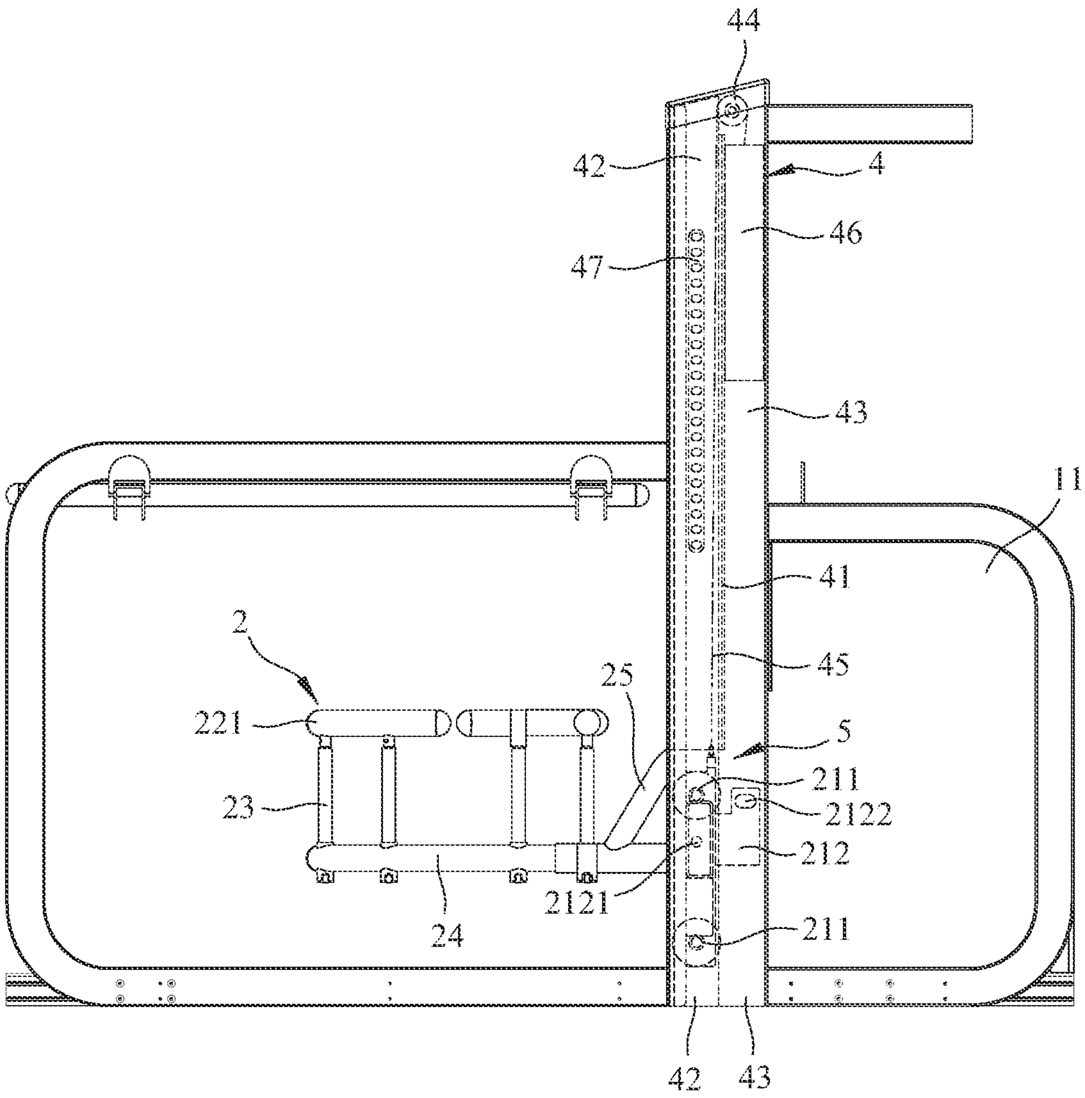
FIG. 3 is a planar view showing that the rail structure of the present invention and the beam at a lower position relative to the rail.

As shown in FIG. 1 and FIG. 3, the torso support unit 2 is a unit that is arranged between the two rails 4 to support the user's torso to suspend above the platform 10, and the torso support unit 2 can move up and down along the rail 4 so as to facilitate the user's torso to enter or move out of the torso support unit 2. After the user enters the torso support unit 2, the torso support unit 2 can be raised to a desired height, so as to lift the user's torso to a proper suspended state.

Specifically, the torso support unit 2 has a beam 21 for movably connected to the two rails 4, and a torso-holding portion 22 for accommodating the torso and at least one actuating element 23 are fixedly provided on the beam 21. At least one actuating element 23 applies a force to the torso-holding portion 22 to finely adjust the vertical direction of the torso-holding portion 22 to ascend or descend.

More specifically, the torso support unit 2 has a fixing frame 24 on which a plurality of actuating elements 23 is arranged, and the torso-holding portion 22 is connected to the actuating elements 23. For example, a pipe can be bent into a U shape to form the fixing frame 24, and a lower gap 241 is disposed at the bent end of the U shape; a plurality of the actuating elements 23 is erected on the fixing frame 24, and the upper ends of the actuating elements 23 are connected to the torso-holding portion 22, which is driven by the actuating element 23 to move up or down. The preferred embodiment of the present invention is to use a linear actuator such as an electric cylinder or a pneumatic cylinder as the actuating element 23. When the electric cylinder is supplied with electric current, the central axis of the electric cylinder is controlled to move vertically, so that the torso-holding portion 22 is controlled to move up or down.

The torso-holding portion 22 has an annular frame 221, and the inner periphery of the annular frame 221 is provided with a holding element 222 made of a flexible material. For example, the flexible material can be a cloth with sufficient toughness, or any similar material. All or part of the periphery of the holding element 222 is covered and fixed on the annular frame 221; the center of the holding element 222 has a through hole 223 for accommodating the waist or abdomen of the user, and the circumference of the through hole 223 is disposed with a first coupling element 224. For example, the first coupling element 224 may preferably be a first zipper. Similarly, in the present invention, an upper gap 225 is provided at a position corresponding to the lower gap 241 of the fixing frame 24 of the annular frame 221 to facilitate the user to enter and exit the through hole 223 of the holding element 222. The annular frame 221 is arranged above the fixing frame 24, and the central axis of the electric cylinder as the actuating element 23 is connected to the bottom of the annular frame 221. Therefore, when the actuating element 23 is moved upward, the annular frame 221 is lifted upward with respect to the fixing frame 24, and when the actuating element 23 is moved downward, the annular frame 221 is lowered with respect to the fixing frame 24. The purpose of the present invention is to use the actuating element 23 to provide a fine adjustment of the height of the torso-holding portion 22 relative to the fixing frame 24, so as to be used by users with different torso shapes. More particularly, in the present invention, the annular frame 221 is divided by four upper gaps 225 into four independent arc-shaped portions, and each of the arc-shaped portions is driven by a plurality of electric cylinders respectively, so as to adapt to the torso shape and size of different users, as well as matching the form of the sports equipment or rehabilitation equipment. The most suitable height position of the annular frame 221 is fine-tuned by the electric cylinder to fine-tune a specific part of the annular frame 221 through the actuating element. For example, when the annular frame 221 is divided into four parts, the arc-shaped portions in front, rear, left and right sides of the annular frame 221 can be adjusted to different heights.

The torso support unit 2 is connected with a pair of extension rods 25. Specifically, one end of each of the pair of extension rods 25 is connected to the fixing frame 24, and the opposite end is provided with a pivot element 251. A display 26 is provided thereon, and the display 26 can be rotated relatively to the extension rod 25 through the pivot element 251 to adjust the viewing angle of the display 26. More specifically, the display 26 is used in conjunction with equipment such as treadmills, rehabilitation equipment and the like that are mounted on the platform 10 to display information, such as speed, frequency, number of steps, number of times, etc., when the user is using the treadmill, rehabilitation and other equipment.

Figure 4:
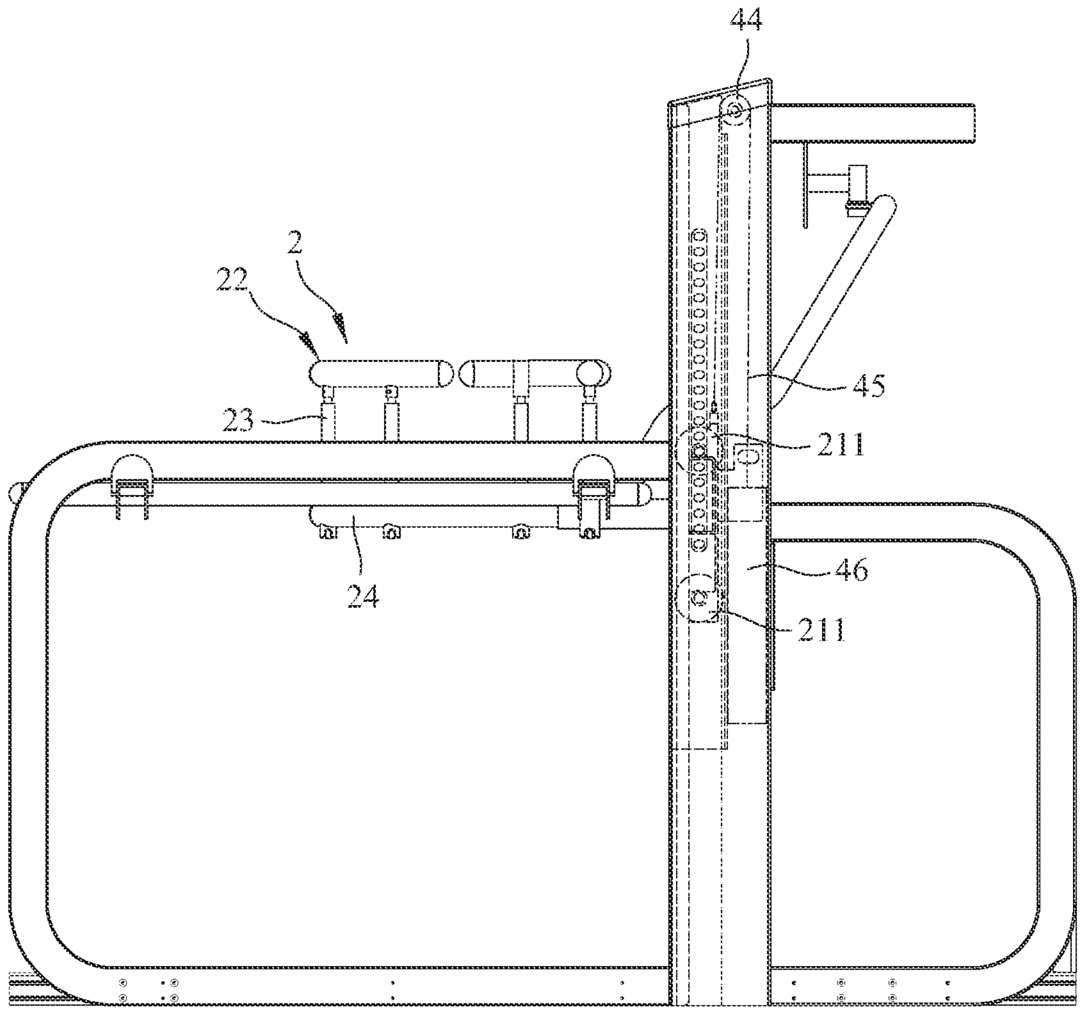
FIG. 4 is a planar view showing that the rail structure of the present invention and the beam at a lower position relative to the rail.
Figure 5:
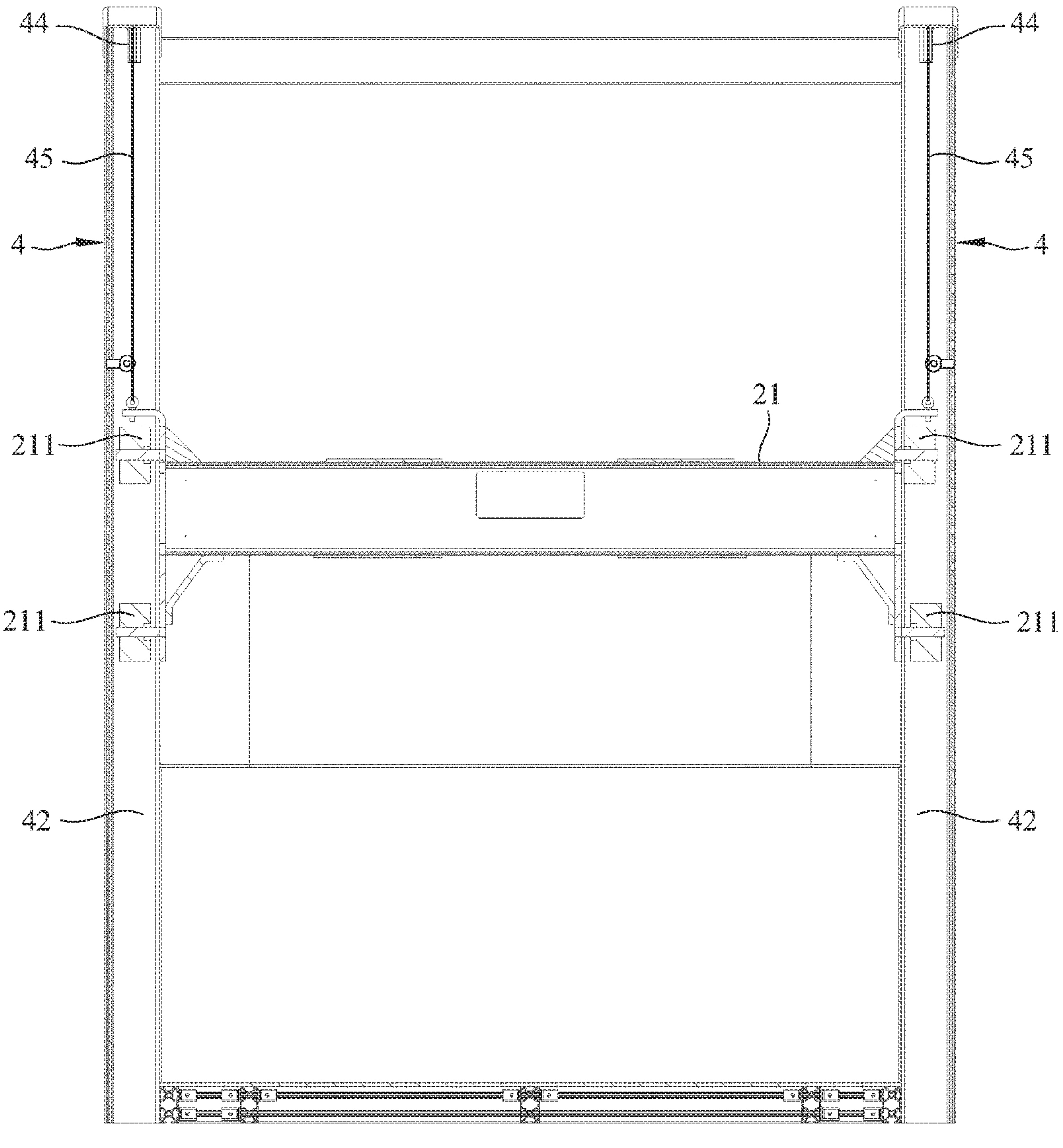
FIG. 5 is a planar view showing the combined relationship between the rail structure and the beam of the present invention along the A-A section line of FIG. 1.
Figure 6:
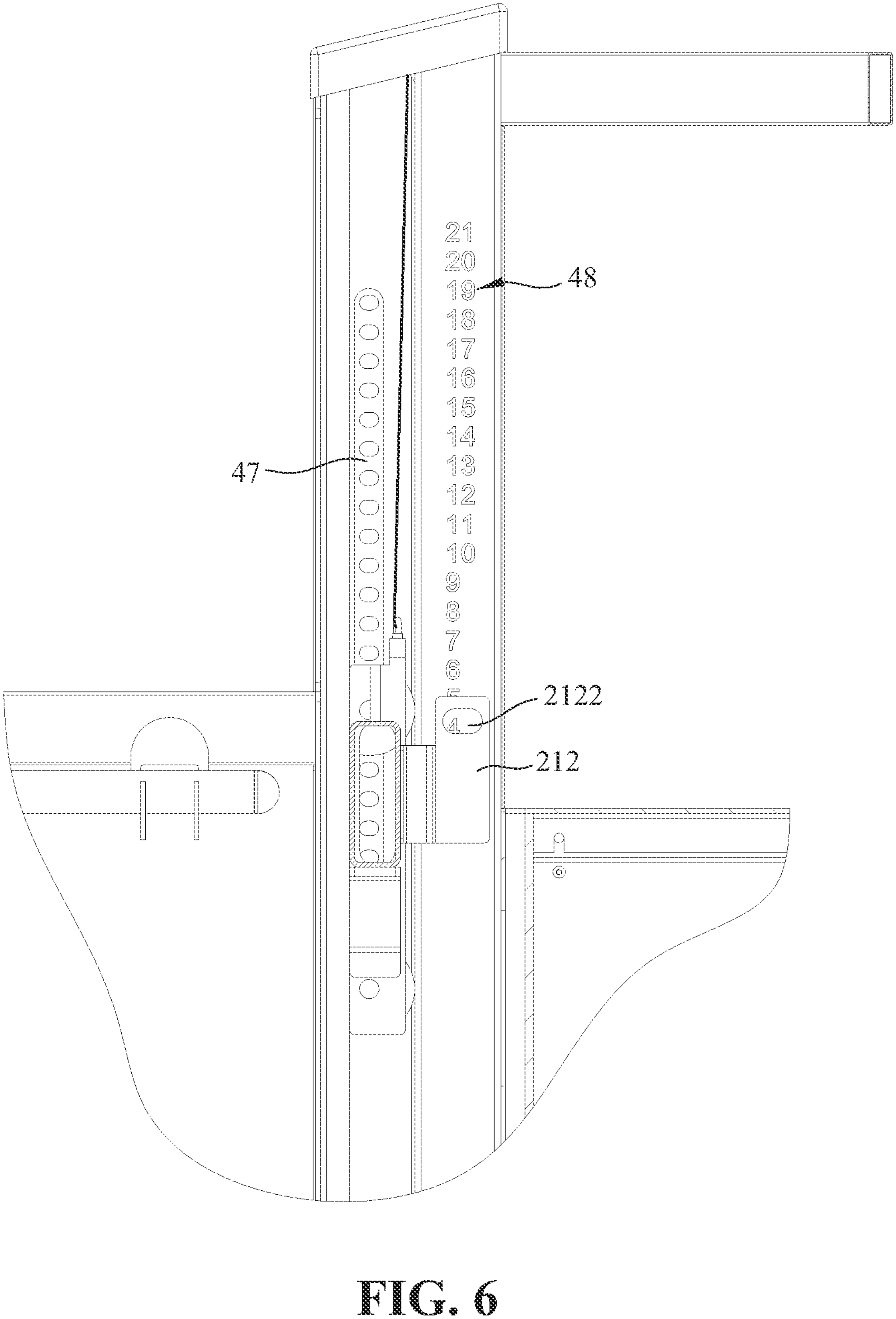
FIG. 6 is a planar view showing the combined relationship between the rail structure and the beam of the present invention along the B-B section line of FIG. 1.

As shown in FIG. 3, FIG. 5 and FIG. 6, the rail 4 has a rail groove extending in the vertical direction, and a partition plate 41 is used to separate a first space 42 and a second space 43 in the rail groove. At least one roller 211 is movably provided at both ends of the beam 21, and the two ends of the beam 21 are fitted in the first spaces 42 of the two rails 4 respectively, so that the rollers 211 roll and stay in contact with the inner wall surface of the rail grooves of the first space 42 or the surface of the partition plate 41. Preferably, in the present invention, a roller 211 can be respectively provided above and below the vertical direction of the end of the beam 21, and the two rollers 211 are in contact with the inner wall surface of the rail groove or the surface of the partition plate 41 to achieve more stable rolling. In addition, the two ends of the upper part of the beam 21 are respectively connected to one end of a cable 45; a pulley 44 is movably arranged on the upper end of the partition plate 41; the cable 45 connected to the beam 21 goes around the pulley 44 and the other end of the enters the second space 43, and a counterweight 46 is arranged at the other end of the cable 45 in the second space 43. The counterweight 46 can be a metal block or any object with a suitable weight, and its weight is substantially equal to the sum of the beam 21 and the torso-holding portion 22 described below, whereby the user only needs to lift or lower the beam 21 manually with ease as the weights of the beam 21 and the torso-holding portion 22 are balanced by the counterweight 46, which can save the effort and is easy to operate. More specifically, when the beam 21 is moved downward (as shown in FIG. 3), the weight of the counterweight 46 will at least counteract the weight of most of the beam 21, so as to prevent the beam 21 from falling rapidly and causing harm to the human torso. Similarly, when the beam 21 is moved upward (as shown in FIG. 4), the weight of the counterweight 46 will at least counteract the weight of most of the beam 21, so that the beam 21 can be easily lifted by manpower.

In addition, as shown in FIG. 1 and FIG. 3, a fixing unit 5 is disposed between the beam 21 and the rail 4, so that the beam 21 is fixed after being adjusted to a predetermined position. The fixing unit 5 includes at least one hole 2121 disposed on an end plate 212 at the end of the beam 21, and a plurality of positioning holes 47 disposed at a suitable height on the side wall of the rail 4 in the vertical direction. The diameter of the plurality of positioning holes 47 is basically equal to the hole 2121, and the trajectory of the beam 21 moving up and down along the rail 4 is consistent with the vertical direction of the positioning holes 47. Therefore, when the beam 21 moves in the vertical direction to a predetermined position and the hole 2121 is positioned corresponding to one of the positioning holes 47, a latch (not shown) can be inserted into both the hole 2121 and the positioning hole 47, so that the beam 21 is fixed at the predetermined position, so as to prevent the beam from moving down or arbitrarily. When the height of the beam 21 needs to be adjusted again, the height of the beam 21 is adjusted after pulling out the latch, and then the latch is inserted into the corresponding holes and positioning holes after the adjustment to fix the beam 21 in the aforementioned manner.

Furthermore, to allow the user to easily understand the adjusted height of the beam 21, a viewing window 2122 can be further provided on the end plate 212, and a height marking portion 48 is provided on the outer side wall surface of the rail 4. The height marking portion 48 is a plurality of numbers or symbols arranged along the rail 4 in the vertical direction, and the numbers or symbols are used to indicate the height on the rail 4. The inner diameter of the window 2122 is larger than each of the plurality of numbers or symbols, whereby when the beam 21 is moved to a predetermined position and the window 2122 corresponds to one of the numbers or symbols, the user can easily see the number or symbol to know the height at which the beam 21 is located.

The torso-wearing unit 3 is a unit that provides for wearing on the torso of the user. As shown in FIG. 2, the torso-wearing unit 3 is a body 30 in a form of a pair of trousers or shorts. A relatively rigid ring 31 is disposed at the inner diameter of the opening of the body 30, where the bottom of the torso can enter to wear. The outer side of the ring 31 is connected with a connecting portion 32, and a second coupling element 33 is arranged on the periphery of the connecting portion 32, and the second coupling element 33 is used for connecting with the first coupling element 224 of the torso support unit 2. Preferably, the first coupling element 224 and the second coupling element 33 are respectively a first zipper and a second zipper which can be coupled to each other.

Figure 7:
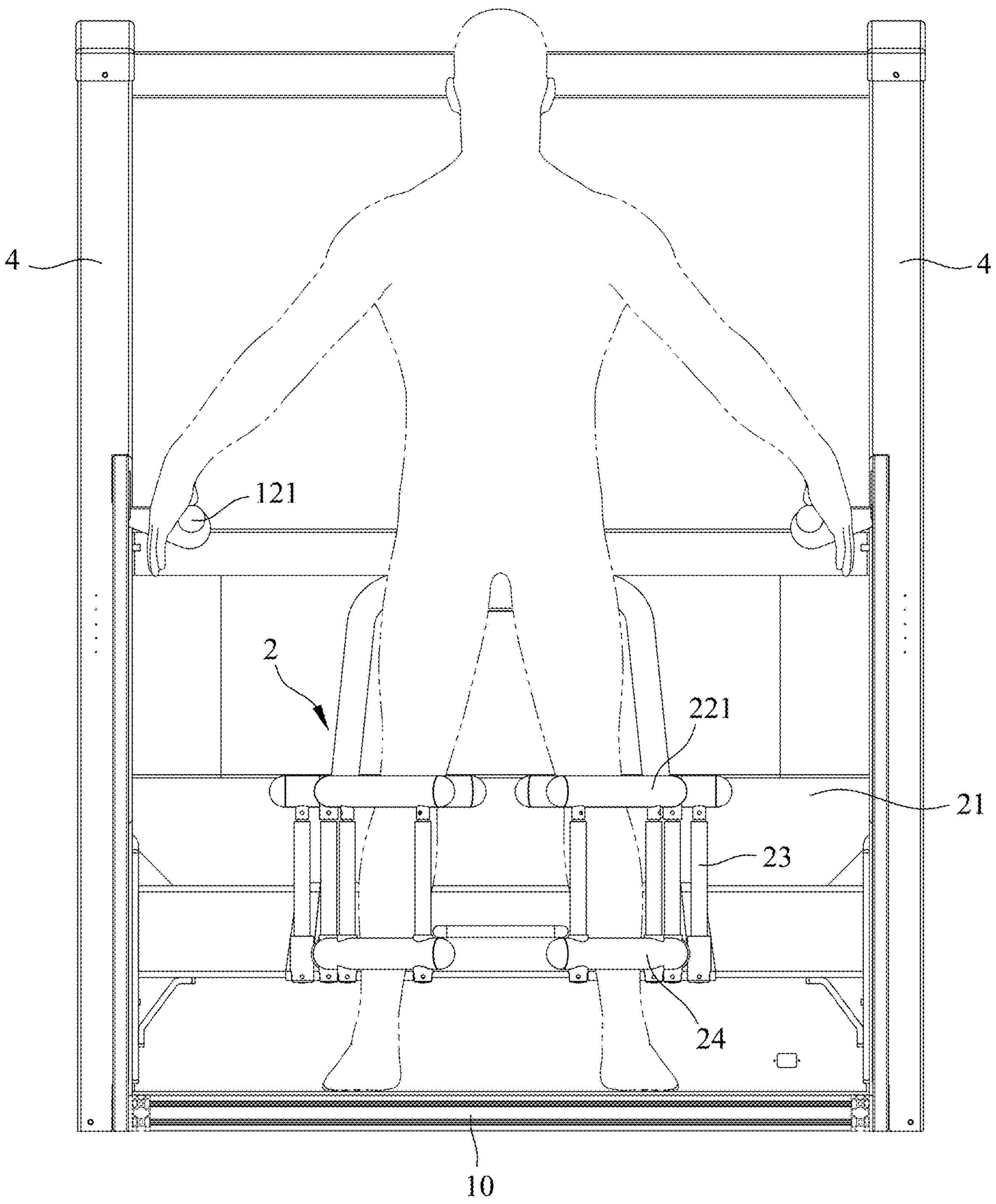
FIG. 7 is a schematic view showing the state when the user enters the torso-holding portion during use.
Figure 8:
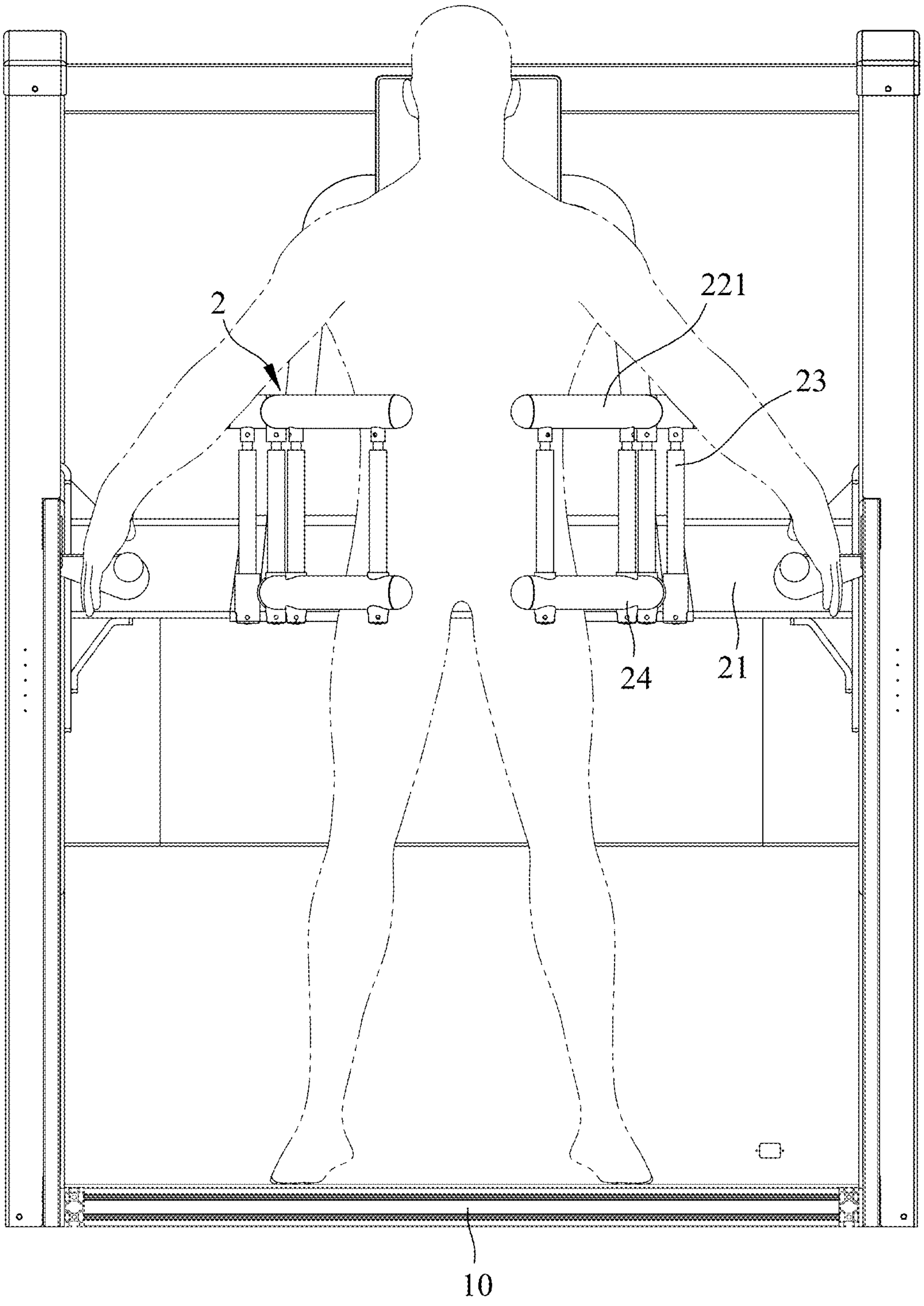
FIG. 8 is a schematic view showing the user held by the torso-holding portion and lifted by the actuating element.

The usage mode of the device of the present invention is described as follows: as shown in FIG. 2, the user first needs to wear the torso-wearing unit 3 in the manner of wearing a pair of trousers, and then the torso support unit 2 is lowered along with the beam 21. The user steps into the annular frame 221 of the torso-holding portion 22 (as shown in FIG. 7), then lifts the torso support unit 2 to an appropriate height position along with the beam 21, and then attaches the first coupling element 224 (i.e., the first zipper) to the second coupling element 33 (i.e., the second zipper). The user's torso is kept in the annular frame 221, and then the cross beam 21 is appropriately lifted to a predetermined height depending on the user's height, and the latch is inserted into the hole in the end plate 212 of the beam 21 and one of the positioning holes 47 of the rail 4 to fix the beam 21. Finally, the actuating element 23 is activated to lift the annular frame 221, so as to lift the user's torso to a proper suspended state (as shown in FIG. 8). In this state, if the platform 10 is equipped with equipment such as a treadmill or a rehabilitation device, the user can perform actions such as running or rehabilitation in a suspended state, thereby, reducing the adverse effects of weight load on the knee joint of the human torso due to gravity. When usage is completed, the torso supporting unit 2 can be removed by reversing the procedure of the above-mentioned use process, and the torso-wearing unit 3 can be taken off.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A device with anti-gravity and suspension, comprising:

a base, disposed with two rails erected symmetrically on two opposite sides;

a torso support unit, connected to the two rails, and movable up or down along the rails, and the torso support unit having a torso-holding portion for accommodating a torso of a user and at least one actuating element, the at least one actuating element exerts a force on the torso-holding portion to adjust the height of the torso-holding portion vertically, the torso-holding portion having a first coupling element; and a torso-wearing unit for being worn on the torso of the user, the torso-wearing unit having a second coupling element, the second coupling element being for interconnection with the first coupling element, wherein the torso support unit has a fixing frame on which a plurality of the actuating elements is arranged, and the torso-holding portion is connected to the actuating elements, wherein the torso-holding portion has an annular frame, and a holding element is disposed in the annular frame, the holding element has a through hole for accommodating the torso, and the circumference of the through hole is provided with the first coupling element, and wherein the annular frame are provided with a plurality of gaps, and the annular frame is divided by the plurality of gaps into a plurality of independent arc-shaped portions.

2. The device with anti-gravity and suspension according to claim 1, wherein the torso support unit comprises a beam, the torso-holding portion is fixedly connected to the beam, both two ends of the beam extend into the two rails respectively, and the end extending into the rails is provided with at least one roller, and the roller is in rolling contact with the inner wall of the rail.

3. The device with anti-gravity and suspension according to claim 2, wherein a counterweight unit connected to the beam is disposed in the rail to assist a force to move the torso support unit up or down.

4. The device with anti-gravity and suspension according to claim 3, wherein the counterweight unit comprises:

a pulley, rotatably arranged in the rail;

at least one cable, around the pulley, one end of the cable connected to the beam; and a counterweight, connected to the other end of the cable.

5. The device with anti-gravity and suspension according to claim 1, wherein the actuating element is an electric cylinder.

6. The device with anti-gravity and suspension according to claim 1, wherein the torso support unit is connected to an extension rod, the extension rod is provided with a pivot element, the pivot element is provided with a display, and the display is rotatable relative to the extension rod through the pivot element.

7. The device with anti-gravity and suspension according to claim 1, wherein the first coupling element and the second coupling element are respectively a first zipper and a second zipper that can be coupled to each other.

* * * * *